(12) United States Patent
Moseley

(10) Patent No.: US 6,357,990 B1
(45) Date of Patent: Mar. 19, 2002

(54) TRUCK FREIGHT LOADING WHEELED ELEVATOR

(76) Inventor: John F. Moseley, 767 N. Beach St., Ormond Beach, FL (US) 32174

( * ) Notice: Subject to any disclaimer, the term of this patent is extended or adjusted under 35 U.S.C. 154(b) by 0 days.

(21) Appl. No.: 09/419,548

(22) Filed: Oct. 18, 1999

(51) Int. Cl.[7] .............................................. B65G 69/22
(52) U.S. Cl. ...................... 414/495; 414/347; 414/537; 14/72.5
(58) Field of Search ................................ 414/347, 391, 414/401, 584, 396, 399, 495, 537; 14/72.5

(56) References Cited

U.S. PATENT DOCUMENTS

| | | | | |
|---|---|---|---|---|
| 2,670,484 A | * | 3/1954 | Bintliff et al. | 14/72.5 |
| 3,972,427 A | * | 8/1976 | Stanley et al. | 414/495 |
| 4,408,739 A | * | 10/1983 | Buchsel | 414/495 |
| 4,417,841 A | * | 11/1983 | Chadwick | 414/495 |
| 4,488,326 A | * | 12/1984 | Cherry | 414/495 |
| 4,606,090 A | * | 8/1986 | Beard | 14/72.5 |
| 4,613,272 A | * | 9/1986 | Vom Braucke et al. | 414/347 |
| 4,923,357 A | * | 5/1990 | Isogai | 414/495 |
| 4,940,379 A | * | 7/1990 | Staege | 414/401 |
| 5,018,931 A | * | 5/1991 | Uttley | 414/495 |
| 5,082,415 A | * | 1/1992 | Hayashi | 414/401 |
| 5,217,342 A | * | 6/1993 | Grether | 414/635 |
| 5,275,526 A | * | 1/1994 | Moseley | 414/495 |
| 5,333,340 A | * | 8/1994 | Moseley | 414/573 |
| 5,525,019 A | * | 6/1996 | Moore et al. | 414/347 |

* cited by examiner

*Primary Examiner*—James W. Keenan
(74) *Attorney, Agent, or Firm*—Arthur G. Yeager

(57) ABSTRACT

A wheeled elevator platform for use in loading and unloading highway trucks from and to a loading dock at a merchandise storage facility. The elevator includes folding ramps, hydraulically operated lifting arms to raise and lower the elevator platform, a plurality of screw jacks to level the platform, and bumpers to absorb the forces of a truck accidentally colliding with the apparatus.

17 Claims, 3 Drawing Sheets

TRUCK FREIGHT LOADING WHEELED ELEVATOR

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to a wheeled elevator platform used to load or unload freight onto or from a highway truck; and more particularly, it relates to such a platform that may be employed where the unloading dock is not deep enough to support an elevator platform apparatus and yet an elevator is needed to reach truck height safely and efficiently.

2. Description of Related Art

Scissor-lift apparatus is known as evidenced by U.S. Pat. No. 3,220,698 to V. H. Carder.

Applicant has two patents, U.S. Pat. Nos. 5,275,526 and 5,333,340 relating to a wheeled elevator apparatus having characteristic similar to that of the present invention. The former patent relates to an elevator apparatus wherein the platform has two ramps for access to and from the platform and the access directions of these two ramps are perpendicular to each other. The latter patent is directed to an elevatable platform having (1) bumpers attached to it to absorb impacts by trucks; (2) a truck restraining hook to grasp the ICC bumper on the truck; and (3) ground anchor means to provide restraining forces to hold the elevatable platform in one location while preventing separation from the truck.

BRIEF SUMMARY OF THE INVENTION

This invention relates to a movable wheeled frame supporting a platform elevatable by hydraulic cylinder means; the frame includes screw-jacks which crank down to lift the frame off its rear wheels and provide a stationary load-bearing contact with the surface of a dock that is lower than the height of the truck; the platform being elevatable by the operation of pairs of arms connected to the frame and elevated by hydraulic cylinder means; the frame being adapted to rest on a level lower than the lowest level attainable by the platform. In some instances the frame base is more restricted in area than that of the elevatable platform.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE INVENTION

This invention relates to a wheeled elevator apparatus for use in unloading or loading highway trucks carrying freight from place to place. Modern day transportation of freight over long distances normally begins and ends at a freight warehouse equipped with a dock, which is an elevated platform of wood, concrete, and/or steel, where a highway truck can back up to, open his cargo doors and wheel the freight from the truck onto the dock or into a warehouse for dry storage until it can be transferred to its intended destination. Because there are no rigid rules and regulations about the height or size of the dock, there are all sizes and shapes of docks; and furthermore, there are many heights and sizes and shapes of highway trucks that deliver freight to and from docks. Accordingly, there is a need to provide means for loading and unloading trucks of different heights and sizes onto and from docks of different heights and sizes. Generally freight is handled by hand trucks or powered trucks, such as fork-lift trucks, so as to use as little time as possible and as few humans as possible. In order to accomplish these purposes dock boards and dock levelers of many types have been used for many years to provide a bridge that is moderately adjustable in height to provide a smooth rolling surface to connect the dock with the inside floor of the truck. In many instances in the past such a smooth connector has not been available to adequately bridge the range of various truck heights for loading or unloading step-wise, e.g., (1) from the truck bed to the ground or dock and (2) from the ground to space available inside a warehouse, which might entail an intermediate step of lifting the freight up and onto a dock before moving it inside the warehouse for temporary storage. If the dock surface is sufficiently large to permit an elevator apparatus on the dock, such as those of applicant's previously mentioned patents, it might be relatively easy to unload the truck that could back up to that elevator apparatus positioned on the dock surface. If the dock was restricted in dock surface area, and the truck approach space is insufficient to position the elevator apparatus in front of the dock, the truck might have to be unloaded in the truck parking area and the freight separately and inefficiently transferred to the dock. It is an object of this invention to provide a wheeled elevator apparatus that can solve many of the freight transfer problems in instances where docks and trucks are ill-matched for freight transfer using previously available means by positioning a portion of the elevator on the dock surface and the remainder in front of the dock.

Figure 1:
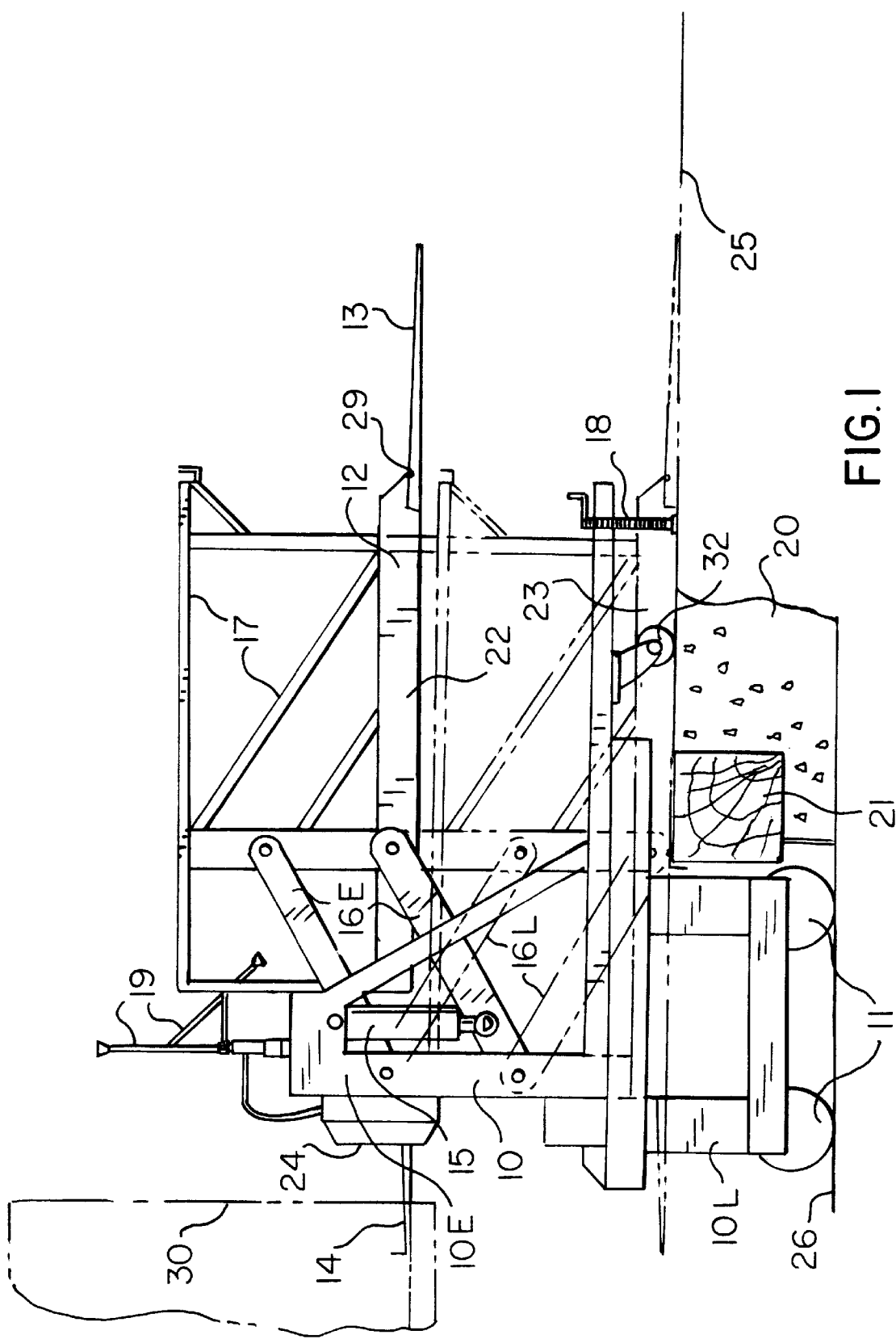
FIG. 1 is a side elevational view of one type of elevatable platform of this invention.
Figure 2:
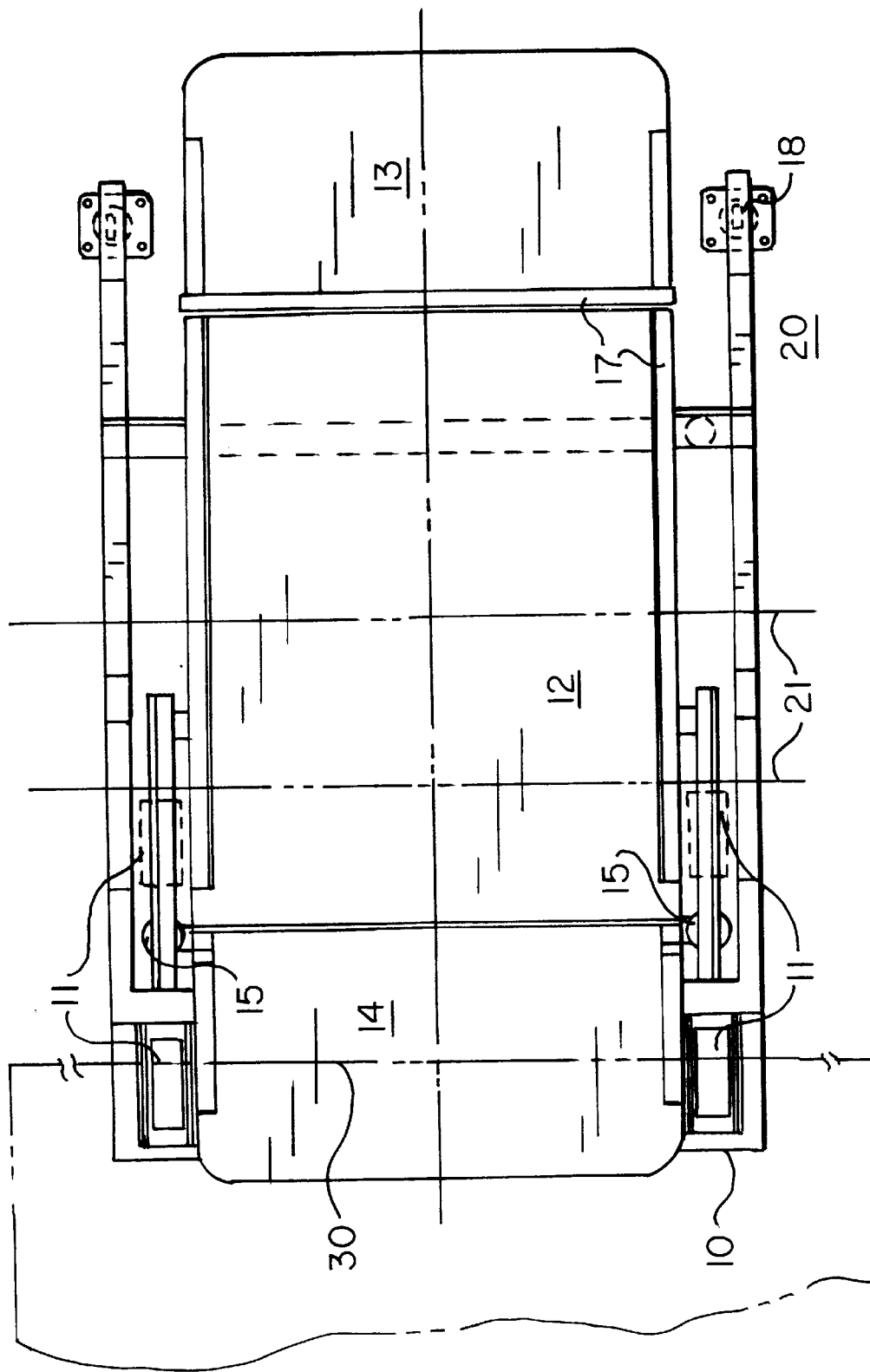
FIG. 2 is a top plan view of the elevatable platform of FIG. 1.

In FIGS. 1 and 2 there are shown two views of one type of elevator apparatus that can be rolled into position to provide a bridge between a low dock and a normally higher highway truck for the transfer of freight therebetween. In this situation a highway truck extends back to 30 with the truck floor 31. The elevator apparatus having a frame 10 includes a truck-end ramp or bridge 14 and a dock-end ramp 13 connected to an elevatable platform (22 in A its elevated position and 23 in its lowered position). Freight on the truck is unloaded by moving it across ramp 14 to platform 12 in its elevated position 22. Platform 12 is then lowered to position 23 where the freight is moved across ramp 13 to dock 25 which is level with the warehouse floor (not shown). The freight is normally moved by hand truck, pallet and hand pallet jack, electric powered pallet jack or truck (e.g., a fork lift motorized truck); or by any other means available.

The elevator apparatus includes a mainframe 10 having an upper elevated section 10E and a lower chassis 10C; and an elevatable position 22 or downward to its lower position 23. The apparatus in these drawings includes two pairs of lifting arms 16, a pair of hydraulic cylinders 15 suitable control levers 19, and a railing structure 17 to keep persons and freight from falling off platform 12. Arms 16 are shown at 16E in their elevated position and 16L in their lower position. Platform 12 has two access ramps that are in line with each other and are connected to platform 12 by hinges 29, and may be folded upward when not in use or when the entire apparatus is moved to another location. Access ramp 13 connects platform 12 to dock 20 and ramp 14 connects platform 12 to the freight truck floor (shown only by 30 representing the rearmost wall of the enclosed truck. With both ramps 13 and 14 down in operating position as shown in FIGS. 1 and 2 there is a relatively flat and level surface from the interior of the truck to the warehouse floor for the movement of freight thereon.

Figure 3:
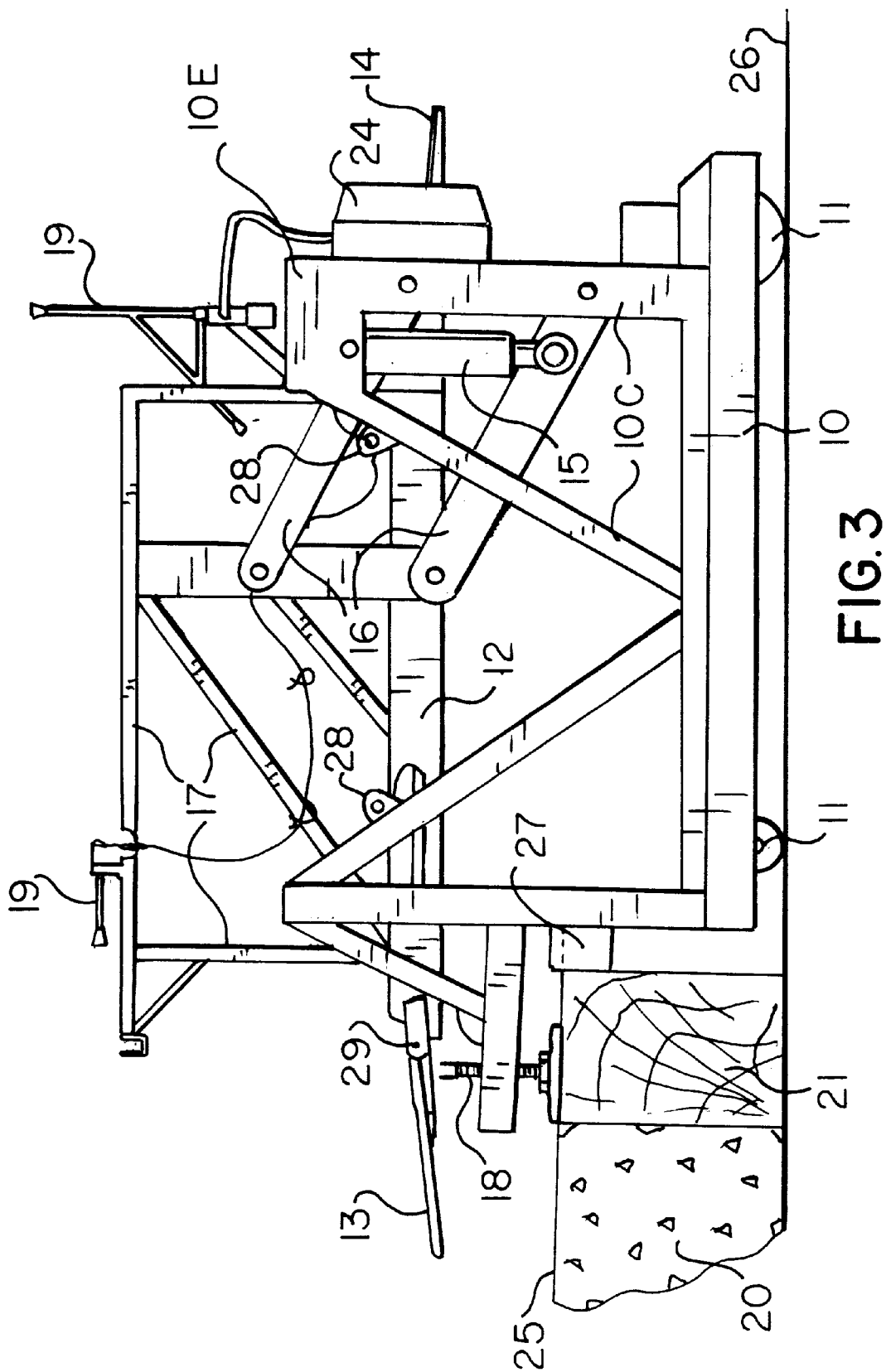
FIG. 3 is a side elevational view of a second type of elevatable platform of this invention.

Included are leveling and stabilizing jacks 18 attached to main frame 10 for lifting the apparatus off wheels 11 so as to provide a more steady and level elevator apparatus. There may be 2 or more jacks included on main frame 10, although for illustration purposes there is shown only one in FIG. 1 and two in FIG. 2. The apparatus, of course, has wheels transport 11 for moving it from place to place. The exact placement of wheels 11 is not a part of this invention since the art of wheel placement is well known and depends on the center of gravity of the apparatus. Shown in FIG. 1 is an arrangement for transporting the apparatus close to a dock having a lower than truck height upper surface. The design in FIG. 3 shows a different arrangement of supporting wheels when there is insufficient dock space to allow most of the lift to be placed on the dock. Of course, the arrangement of frame supporting wheels and jacks will depend on how much room there is on a given dock and in front of the dock, without taking up excessive truck approach space given the specific location. The weight of the lift and load on the lift is supported by both the jacks on the dock surface and the ground in front of the dock when the invention is positioned there for use.

Generally, there will always be included in this apparatus a bumper 24 which can absorb the shock of a truck backing too fast into the apparatus of this invention with the front surface of the dock furnishing the support to hold this invention in one spot when impacted.

FIG. 3 shows a different design for the elevator apparatus of this invention than that of FIGS. 1 and 2. Here the mainframe 10 of the apparatus has different designs for the upper elevator frame 10E and the lower chassis frame 10C than that of the apparatus shown in FIGS. 1 and 2. The frame in front of the dock is much longer in FIG. 3, which requires more parking and truck approach space in front of dock 20 and its facing 21 and bumper 27. While requiring more space in front of the dock the apparatus requires less space on the dock. Less space on the dock surface means that the apparatus must function as a longer bridge beyond the dock than that of FIGS. 1 and 2. This may be an advantage in that the area of platform 12 may be made larger and therefore, the unloading or loading of the truck might be shorter in time than that when using a smaller platform as in FIGS. 1 and 2 which would not fit on top of the dock with limited space above. It is apparent that different designs of the apparatus may be appropriate for different docks, but each design will include the same features of wheels, ramps, and elevatable platform, and operating controls for platform movement and up and down hydraulically for load support and stabilization with a portion of this invention positioned in front of the dock and supported by the truck approach, and a portion positioned on the dock surface and supported by the dock.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A movable apparatus having spaced wheels for transferring freight between a truck and a loading dock, comprising a wheeled base frame structure disposable over a loading dock and resting on ground in front of a dock and having forward and rear portions, said wheels being located on said forward portion and engageable with the ground, a stabilizing jack means coupled to said rear portion of said base frame structure for stabilizing said base frame structure on a loading dock when disposed over a loading dock, said base frame structure including a pair of hydraulic lifting arms, an elevatable loading platform for receiving a load from a loading dock or from a truck, said elevatable loading platform being lifted by said pair of hydraulic lifting arms, said elevatable loading platform being pivotally connected to said pair of hydraulic lifting arms, and said elevatable loading platform being disposed partially over a loading dock.

2. The apparatus of claim 1 wherein said elevatable loading platform further comprises a first and a second movable spaced access ramp, said first access ramp extends toward a truck, and said second access ramp extends toward a loading dock.

3. The apparatus of claim 1 wherein said elevatable loading platform is movable between first and second positions, said first position being when said elevatable loading platform is disposed for engagement with a loading dock and said second position being when said elevatable loading platform is elevated by said pair of hydraulic lifting arms.

4. The apparatus of claim 1 wherein said stabilizing jack means is selectively extendable to elevate some of the wheels of said apparatus from ground in front of a loading dock.

5. The apparatus of claim 1 wherein said stabilizing jack means includes a pair of spaced jacks selectively adjustable to vary the height of said base frame structure with respect to a loading dock.

6. The apparatus of claim 1 wherein said base frame structure further includes a bumper disposed on said base frame structure where said base frame structure meets a truck for absorbing a horizontal impact when a truck is backing against said bumper.

7. The apparatus of claim 1 wherein said base frame structure further comprises wheels to move said base frame structure along ground.

8. A movable apparatus for transferring freight between a truck and a loading dock having an upper horizontal surface and a front surface and a lower surface forwardly thereof said apparatus comprising a frame structure including an upper portion for receiving a load from a loading dock or from a truck and a lower portion, said upper portion being rigidly connected to said lower portion, said upper portion being disposable over an upper horizontal surface of a loading dock, and said lower portion being disposed on a lower surface forwardly of a front surface of a loading dock, said upper portion including a lifting means, an elevatable platform for receiving a load from a loading dock or a truck, said platform being pivotally connected to said lifting means.

9. The apparatus of claim 8 wherein said platform further comprises a first and a second movable spaced access ramp, said first access ramp extends toward a truck, and said second access ramp extends toward a loading dock, said second access ramp being pivotally extendable over an upper horizontal surface of a loading dock.

10. The apparatus of claim 8 wherein said frame structure further includes a bumper disposed on said frame structure for absorbing a horizontal impact when a truck is backing against said bumper.

11. The apparatus of claim 8 wherein said elevatable platform is movable between first and second positions, said first position being when said platform is disposed on a loading dock, and said second position being when said elevatable platform is elevated a distance by said lifting means.

12. The apparatus of claim 8 wherein said lower portion further comprises a selectively movable stabilizing jack means for supporting a load and the weight of said frame structure on a loading dock.

13. A movable apparatus for transferring freight between a truck and a loading dock having an upper horizontal surface and a front surface and a lower surface forwardly thereof, said apparatus comprising a frame structure including an upper portion for receiving a load from a loading dock or from a truck and a lower portion, said upper portion being rigidly connected to said lower portion, said upper portion being disposable over an upper horizontal surface of a loading dock, and said lower portion being disposed on a lower surface forwardly of a front surface of a loading dock, said upper portion further comprises a stabilizing jack means for stabilizing said upper portion when said upper portion is disposed over and engaged with an upper horizontal surface of a loading dock.

14. The apparatus of claim 13 wherein said lower portion further comprises spaced wheels for moving said lower portion along a lower surface forwardly of a loading dock.

15. A movable apparatus for transferring freight between a truck and a loading dock having an upper horizontal surface, a front surface, and a lower surface forwardly thereof said apparatus comprising a wheeled frame structure having forward and rear portions and including a hydraulic lifting means, said hydraulic lifting means being pivotally coupled to said frame structure, a selectively movable and adjustable stabilizing member engageable with an upper horizontal surface of a loading dock and coupled to said rear portion to stabilize said frame structure when transferring freight between a loading dock and a truck, an elevatable loading platform for receiving a load from a loading dock or a truck, said loading platform being pivotally coupled to said hydraulic lifting means, a portion of said frame structure, being disposed over an upper horizontal surface of a loading dock, said apparatus having spaced wheels connected to said frame structure and supported by a lower surface of a loading dock.

16. The apparatus of claim 15 wherein said elevatable platform includes first and second access ramps, said first access ramp extending toward a truck, and said second access ramp extending toward a loading dock, said second access ramp being pivotally extendable over an upper horizontal surface of a loading dock.

17. The apparatus of claim 15 wherein said frame structure further includes a bumper disposed on said frame structure for absorbing a horizontal impact when a truck backs against said bumper.

* * * * *